United States Patent
Park et al.

(10) Patent No.: US 7,423,556 B2
(45) Date of Patent: Sep. 9, 2008

(54) METHOD AND DEVICE FOR KEY INPUT IN MOBILE TERMINAL

(75) Inventors: Sung-Jin Park, Seoul (KR); Hee-Jeong Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 262 days.

(21) Appl. No.: 11/226,429

(22) Filed: Sep. 15, 2005

(65) Prior Publication Data

US 2006/0055567 A1  Mar. 16, 2006

(30) Foreign Application Priority Data

Sep. 16, 2004 (KR) ...................... 10-2004-0074155

(51) Int. Cl.
*H03M 11/00* (2006.01)
(52) U.S. Cl. ..................... 341/22; 345/168; 341/26; 708/146
(58) Field of Classification Search ............. 341/20, 341/22, 26; 345/168; 708/145, 146, 142
See application file for complete search history.

(56) References Cited

U.S. PATENT DOCUMENTS

2002/0135579 A1   9/2002   Bong
2002/0143741 A1   10/2002   Laiho et al.

FOREIGN PATENT DOCUMENTS

| EP | 0 898 222 | 2/1999 |
|---|---|---|
| JP | 02-245917 | 10/1990 |
| JP | 06-308957 | 11/1994 |
| JP | 2000-075998 | 3/2000 |
| JP | 2000-251584 | 9/2000 |
| JP | 2002-351599 | 12/2002 |
| WO | WO 91/03782 A | 3/1991 |
| WO | WO 02/27432 A | 4/2002 |

*Primary Examiner*—Albert K Wong
(74) *Attorney, Agent, or Firm*—Roylance, Abrams, Berdo & Goodman, LLP

(57) ABSTRACT

A method for inputting characters in a mobile terminal is provided. The method involves the steps of detecting any key pressing event on a key input unit, storing the detected key pressing event and performing an operation corresponding to the key pressing event, determining whether a predetermined multi-click key is pressed after the previous key pressing event, and when the multi-click key is pressed, performing the operation corresponding to said key pressing event occurring repeatedly a predetermined number of times.

9 Claims, 3 Drawing Sheets

METHOD AND DEVICE FOR KEY INPUT IN MOBILE TERMINAL

PRIORITY

This application claims the benefit under 35 U.S.C. §119(a) of a Korean Patent Application entitled "Method and Device for Key Input in Mobile Terminal", filed with the Korean Intellectual Property Office on Sep. 16, 2004 and assigned Serial No. 2004-74155, the entire contents of which are hereby incorporated by reference.

BACKGROUND OF THE INVENTION

1. Field of the Invention

The present invention relates to a mobile terminal. More particularly, the present invention relates to a method and device for inputting characters in a mobile terminal.

2. Description of the Related Art

Due to developments in mobile telecommunications, mobile terminals have become popular, enabling users to communicate over the phone while moving. Through such mobile terminals, it is possible to transmit and receive data such as text as well as voice. Mobile terminals comprise a key input unit for inputting data such as characters necessary to transmit and receive data.

It is a current trend that mobile terminals are becoming smaller and lighter for their portability. As the size of terminals has become smaller, the area occupied by the key input unit has been reduced. As a result, most current terminals comprise only basic function keys and number keys. However, the number of required keys on a mobile terminal is increasing in order to meet the need to perform various functions. Therefore, mobile terminals have been developed so that a single key can perform different operations according to the time duration or number of key-pressings. It is easy to establish a key for performing one operation (for example, pressing the "1" key for a longer duration in order to select a function mode). However, the number of keys on the key input unit is not sufficient to designate each key to input a particular character according to the key-pressing time and number. To solve this problem, conventional terminals assign a plurality of characters to a single key so that the plurality of characters can be input according to the number of key-pressings.

FIG. 1 is a view illustrating a conventional 12-key keypad for inputting digits, characters or symbols in a mobile terminal.

Referring to FIG. 1, a user can input a Korean character "ㅂ"or an English character "S" by pressing the "7" key three times consecutively. Specifically, when the "7" key is pressed three times in the Korean input mode, three different characters "ㅂ," "ㅃ"and "ㅄ"are input in turn in the order imprinted on that key. In the English input mode, "P," "R" and "S" are input in turn with the three consecutive pressings of the "7" key. A direction key is generally used to input a space between characters. However, a change of mode to the English input mode should precede the pressing of the direction key to input a space between Korean characters. When the user wishes to input an emoticon or a character in a next line, he or she has to hit the direction key repeatedly until a cursor is placed on the next line.

As explained above, a conventional keypad of a mobile terminal assigns a plurality of characters to each number key. Accordingly, to input a desired character, the user has to press the corresponding key from one to two or more times according to the order in which the character is imprinted on the key.

With the repeated pressing of a key, characters imprinted on that key are displayed in turn on the display screen of the mobile terminal. Since the number of keys provided on the conventional keypad is limited to twelve, each key is generally assigned three or more characters. To input a desired character, the user has to press the corresponding key up to four or five times. It is cumbersome and time-consuming to repeatedly press a key. Also, it shortens the life of the key.

As a solution to the above problems, characters can be assigned to the number keys in a new layout that enables input of each character with fewer keystrokes. However, users may be inconvenienced until they get accustomed to the new layout of characters.

SUMMARY OF THE INVENTION

Accordingly, the present invention has been made to address the above-mentioned problems occurring in wireless mobile terminals. An object of the present invention is to provide a method for inputting characters in a mobile terminal with a reduced number of key pressings.

Another object of the present invention is to provide a method for implementing the input of Korean or English characters in a mobile terminal.

Still another object of the present invention is to provide a method and device for effectively inputting characters without significant change to the conventional alignment of English or Korean characters on number keys.

In order to accomplish the above objects of the present invention, a method is provided for inputting characters in a mobile terminal. The method comprises the steps of detecting any key pressing on a key input unit, storing the detected key pressing event and performing an operation corresponding to the key pressing event, determining whether a predetermined multi-click key is pressed after the previous key pressing, and when the multi-click key is pressed, performing the operation corresponding to said key pressing event occurring repeatedly a predetermined number of times.

In accordance with another aspect of the present invention, a device is provided for inputting characters in a mobile terminal. The device comprises a key input unit provided with number keys, each of which is assigned one digit and at least one character, and non-number keys, one of which functions as a multi-click key, and a control unit for detecting any key pressing on the key input unit to perform an operation corresponding to the key pressing event, detecting a subsequent pressing of the multi-click key, and upon detecting the pressing of the multi-click key, performing the operation corresponding to said key pressing event occurring repeatedly a predetermined number of time.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention will be described with reference to the accompanying drawings. In the following description of the present invention, a detailed description of known functions and configurations incorporated herein will be omitted for clarity and conciseness. Certain terms are defined herein in view of the functions implemented by the application of an exemplary embodiment of the present invention. Those terms can be interpreted differently in accordance with custom or intention of a user or an operator.

Figure 1:
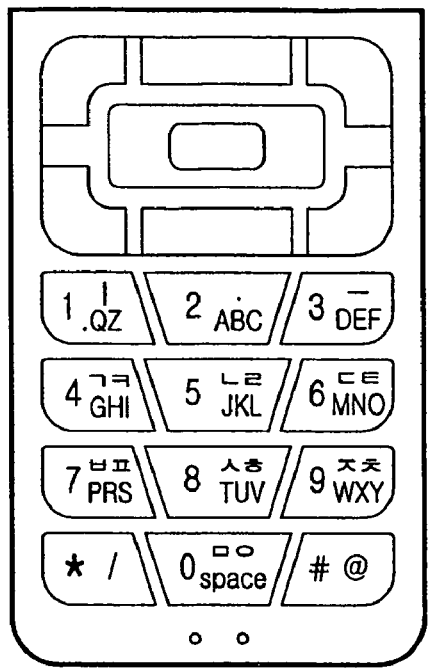
FIG. 1 is a view illustrating a conventional keypad for inputting digits, characters or symbols in a mobile terminal.
Figure 2:
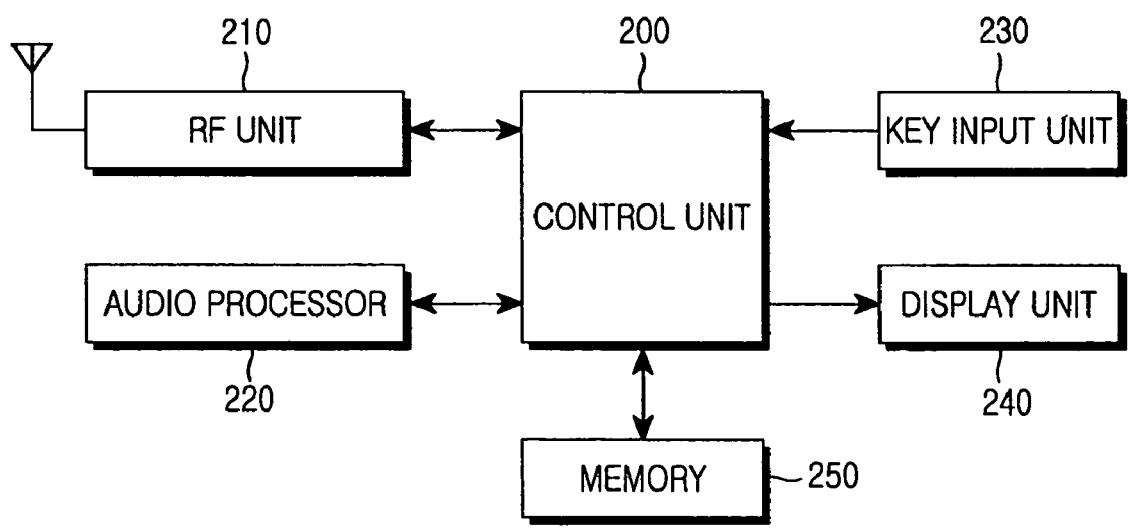
FIG. 2 is a block diagram of a mobile terminal according to an exemplary embodiment of the present invention.

FIG. 2 is a block diagram showing the structure of a mobile terminal according to an exemplary embodiment of the present invention.

Referring to FIG. 2, a control unit 200 controls overall operations of the mobile terminal. A memory 250 stores programs for controlling the overall operations of the mobile terminal. Data input or output during the operations of the mobile terminal, status information of the mobile terminal and text messages transmitted from a text message service system center are stored in respective areas of the memory 250.

An RF unit 210 performs wireless communications with a base station. The RF unit amplifies and filters transmitted or received signals to enable RF signal exchanges between the control unit 200 and the base station. An audio processor 220 modulates an audio signal input through a microphone into an RF signal under the control of the control unit 200 and outputs a ring signal generated from the base station through a ringer.

A key input unit 230 is provided with a plurality of number and function keys. When a specific key is pressed, the key input unit 230 generates corresponding key data and outputs the data to the control unit 200. A display unit 240 comprises a Liquid Crystal Display (LCD) for displaying various data and information. The display unit 240 displays the key data generated by the key input unit 230 and various information signals input from the control unit 200.

Figure 3:
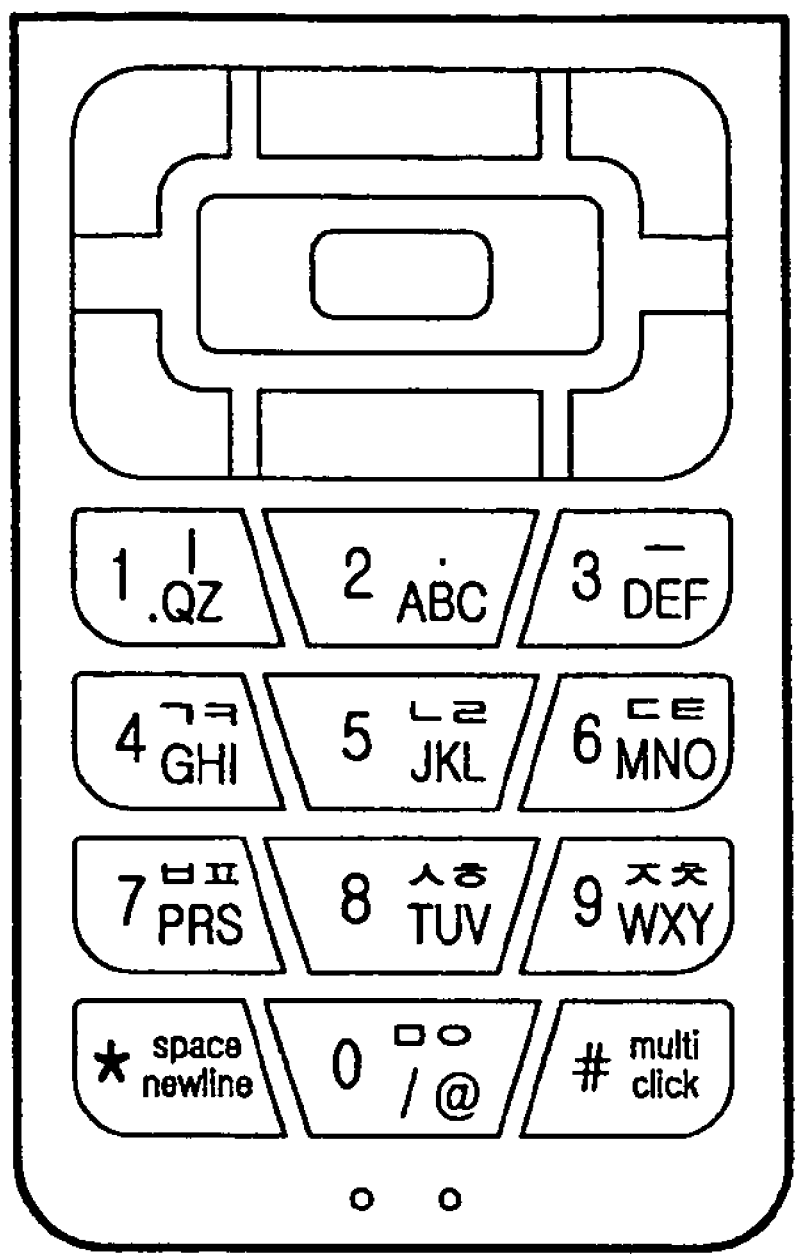
FIG. 3 is a view illustrating a keypad for inputting digits, characters or symbols in a mobile terminal according to an exemplary embodiment of the present invention.

FIG. 3 is a view illustrating a keypad for inputting digits, characters or symbols in a mobile terminal according to an exemplary embodiment of the present invention.

Referring to FIG. 3, the "*" key is assigned a space function and a new line function, while the "#" key is assigned a multi-click function. The two symbols "/" and "@," which are typically assigned to the "*" and "#" keys on a conventional keypad, are both assigned to the "0" key in an exemplary embodiment of the present invention. Although not illustrated, it is also possible to change the functions of the "*" and "#" keys by assigning the space and new line functions to the "#" key and the multi-click function to the "*" key.

In other words, the "*" key with the space and new line functions is used to input a space between characters or move a cursor to a new line, eliminating the need to repeatedly press a direction key. Also, the "#" key with the multi-click function is used to reduce the number of pressings of a same key when inputting an English or Korean character in the character input mode. For example, when the "7" key is pressed and followed by the multi-click key ("#" key), a character corresponding to the three consecutive pressings of the "7" key is input. Since the two symbols "/" and "@" are generally used in English text and email, but very rarely in Korean text, they are established to be used in the English input mode only.

The multi-click key can be established to scroll up or down the screen displaying multiple items under a specific menu by one page, which is a function similar to the page-up or page-down key on a computer keyboard. In the character input mode, the multi-click key can be used to produce the same effect as a predetermined number of pressings of a previously pressed number key. In a mode for viewing a list of outgoing or incoming calls or a mode for viewing received text messages stored in a received message mailbox, the multi-click key can be used to scroll up or down the display screen by one page. Of course, it is possible to establish the multi-click key to implement the same function as established in the character input mode (in other words, multiple pressings of a key) even in the menu mode. The user can optionally establish a key-pressing repetition number or a page down (a next page) to be implemented by the multi-click key in programs for different modes of the mobile terminal, such as the message input mode, menu mode and telephone number search mode.

As explained above, the multi-click and space/new-line functions are assigned to keys such as "*" and "#" with no characters assigned. A key with the multi-click function is called a multi-click key in an exemplary embodiment of the present invention.

Table 1 below shows Korean and English characters input by pressing each number key and the multi-click key.

TABLE 1

| Korean character + multi-click | English character + multi-click |
|---|---|
| ㄱ → ㄲ | . → Z |
| ㄷ → ㄸ | A → C |
| ㅂ → ㅃ | D → F |
| ㅅ → ㅆ | G → I |
| ㅈ → ㅉ | J → L |
|  | M → O |
|  | P → S |
|  | T → V |
|  | W → Y |

Table 1 shows Korean and English characters corresponding to the consecutive pressings of each number key and the multi-click key. The multi-click key produces the same effect as the double pressings of a previously pressed key. For example, when the "7" key is pressed and followed by the multi-click key, the same effect as the three consecutive pressings of the "7" key is produced.

In the prior art, the "8" key is pressed three times consecutively to input an English character "V." With the keypad as illustrated in FIG. 3, however, the user can input the same character "V" by pressing the "8" key once and the multi-click key.

Figure 4:
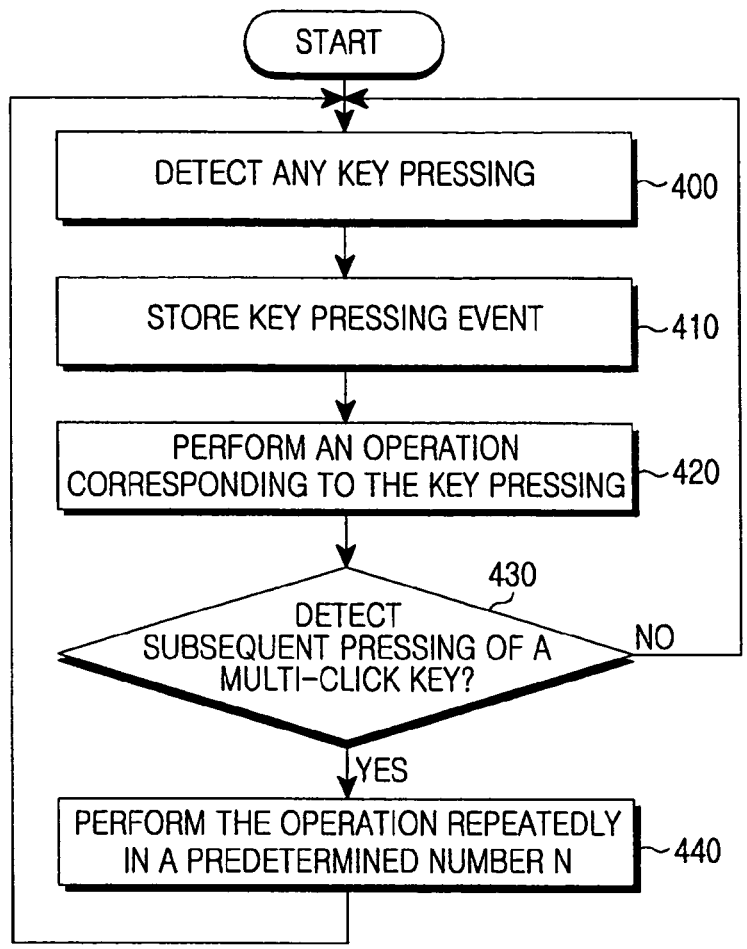
FIG. 4 is a flow chart illustrating a process of inputting characters by using a multi-click key according to an exemplary embodiment of the present invention.

FIG. 4 is a flow chart illustrating a process of inputting characters by using a multi-click key according to an exemplary embodiment of the present invention.

The control unit checks for any key pressing events at step 400. After storing the key pressing event in the memory at step 410, the control unit implements an operation corresponding to the event at step 420. The control unit then proceeds to step 430 to determine whether the multi-click key is pressed. If not, the control unit will return to step 400. If the multi-click key is pressed, the control unit will proceed to step 440 to repeatedly implement the same operation corresponding to the previous key pressing event occurring a predetermined number of times N.

"N" is a predetermined number of key-pressing repetition. For example, N can be established to be two (N=2). In such a case, the user can input an English character "L" by pressing the "5" key once and then the multi-click key. "K" is input when the "5" key is pressed twice. If the multi-click key is pressed again, "J" will finally be input.

The multi-click key can be used to reduce the number of keystrokes when selecting a menu or a function, as well as when inputting characters.

Figure 5:
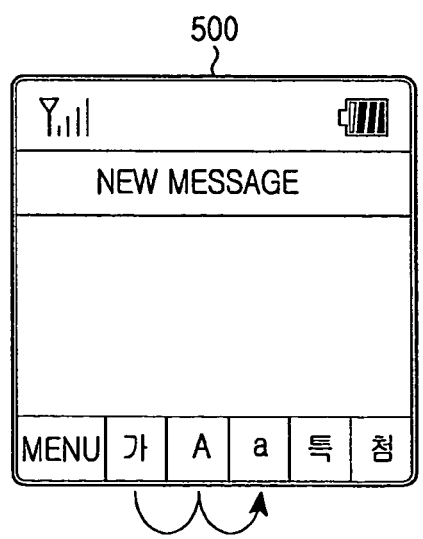
FIG. 5 is a view illustrating an editor window for inputting a text message according to an exemplary embodiment of the present invention.

FIG. 5 is a view illustrating an editor window for inputting a text message according to an exemplary embodiment of the present invention.

As shown in FIG. 5, a text editor window 500 comprises a menu for character mode changes. In order to change the character mode from Korean to English uppercase, from English uppercase to English lowercase and from English lowercase to symbols, a mode change key should be pressed repeatedly. At this time, the mode change key can be pressed once and followed by the multi-click key to produce the same effect as the three consecutive pressings of the mode change key. The multi-click key can be used to move a cursor over two or three items of a menu, such as a bell sound, idle screen, phonebook, outgoing/incoming call list, control panel, photograph or moving picture menu. The user can more rapidly search the names and telephone numbers stored in the phonebook by using the multi-click key.

To input a Chinese or Japanese character by using a conventional keypad, users have to enter a corresponding pronunciation in English and then hit a convert key to sort through a list of Chinese or Japanese characters that match the pronunciation. Since a right character should be selected from multiple listed characters, more keystrokes are required to input a Chinese or Japanese character, as compared to the keystrokes to input a Korean character. It is possible to use the multi-click key to rapidly select the right one from the listed characters. Users can establish a number of keystroke repetition implemented by the multi-click key to two or three so that the multi-click key can be effectively used as a double-click or triple-click key in inputting Chinese or Japanese characters, selecting an item of a menu or implementing any other operation requiring repeated keystrokes.

Table 2 shows the results of simulations which evaluate the effects of the multi-click key according to an exemplary embodiment of the present invention.

TABLE 2

| Sample Text Input | Improvement (%) (Key Hit Reduction) |
|---|---|
| History of Three States 1 to 10 (Korean) | 1.66% (77296056/7859897) |
| 1,000 SMS Messages (Korean) | 10%~1.65% (80 bytes reduced) |
| Minority Report (English) | 16.51% (205097/245634) |

As shown in Table 2, when the multi-click key is established to have a double-click function ("N=2"), it can improve the key input efficiency by 16.51% in an English text input. In other words, a keypad with the double click function according to an exemplary embodiment of the present invention can reduce the number of keystrokes by 16.51%, as compared to a conventional keypad. Also, the simulation results show that the multi-click key can improve the key input efficiency by about 2% to 10% when used to input a Korean text.

As explained above, the present invention provides an improved method and device for effectively and rapidly inputting characters without any big change to the character alignment on a conventional keypad. The method and device of the present invention are applicable to any of the Korean-type, European-type and US-type mobile terminals and any mobile terminals supporting Chinese or Japanese. Mobile terminals with a multi-click function according to the present invention can greatly improve the key input efficiency.

Although exemplary embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for inputting characters in a mobile terminal, comprising the steps of:
   detecting the actuation of one of a plurality of character keys wherein each character key is associated with a plurality of characters and generates a unique code;
   storing the code and performing an operation in response to the code;
   detecting the actuation of a multi-click key after the detection of the actuation of a character key; and
   performing the operation associated with the code N number of times, where N is greater than 1 and N is a preset value associated with the multi-click key.

2. The method as claimed in claim, 1 further comprising:
   selecting a menu mode displaying multiple items and performing a page down function upon the detection of the pressing of the multi-click key.

3. The method as claimed in claim 1, wherein said multi-click key is any key with no character assigned on the key input unit.

4. The method as claimed in claim 1, wherein said multi-click key is either a "*" key or a "#" key.

5. A device for inputting characters in a mobile terminal, comprising:
   a key input unit provided with a plurality of number keys, each of which is assigned one digit and at least one character, and a multi-click key; and
   a control unit for detecting the actuation of a number key and for performing an operation assigned to the number key, and upon the subsequent detection of the actuation of the multi-click key, performing the operation assigned to the number key a predetermined number of times N, wherein N is greater than 1 and wherein N is a preset value.

6. The device as claimed in claim 5, wherein said key input unit comprises:
   a non-number key having a space function and a new-line function; and
   a 0 key with the symbols "/" and "@" assigned, said symbols "/" and "@" being input only in an English mode.

7. The device as claimed in claim 5, wherein said control unit performs a page down function, upon detection of the pressing of the multi-click key when in a menu mode displaying multiple items.

8. The device as claimed in claim 5, wherein said non-number keys are a "*" key with a "*" symbol assigned and a "#" key with a "#" symbol assigned.

9. The device as claimed in claim 5 wherein the control unit enables a menu mode displaying multiple items and performs a page down function N number of times upon the actuation of the multi-click key.

* * * * *